April 21, 1953

J. H. BALDWIN 2,636,061

DEFERRED ACTION TYPE BATTERY

Filed May 4, 1951

*INVENTOR.*
JOHN H. BALDWIN
BY
*Harry M. Saragovitz*
*Attorney*

Patented Apr. 21, 1953

2,636,061

UNITED STATES PATENT OFFICE 2,636,061

DEFERRED ACTION TYPE BATTERY

John H. Baldwin, Joplin, Mo., assignor to the United States of America as represented by the Secretary of the Army Application May 4, 1951, Serial No. 224,515

1 Claim. (Cl. 136—112)

This invention relates to multiple cell, deferred action type, meteorological batteries adapted for quick activation by "dunking" into an electrolyte, and more particularly to batteries utilizing the electro-chemical system lead-acid-lead peroxide.

Such batteries comprise single cells consisting of a negative plate containing sponge lead, a positive plate containing lead peroxide and absorbent separators installed between them. To activate such batteries they are immersed partially into the acid electrolyte causing the absorbent separator, by capillarity, to absorb the liquid electrolyte.

Various shortcomings and irregularities have been encountered in practical use of such batteries and these difficulties have been found to be due mainly to the fact that the electrolyte will not be absorbed evenly and uniformly by all separators.

It is an object of this invention to overcome the above-mentioned and various other insufficiencies by placing pins of dielectric materials between the positive plates and the separators before partial immersion of the assembled battery in the acid electrolyte, allowing more even and more rapid penetration of the separators by the liquid electrolyte while providing a path of escape for entrapped air.

This and other objects of the invention will become more apparent from the following description and accompanying drawing taken in connection with the appended claim.

Figure 1:
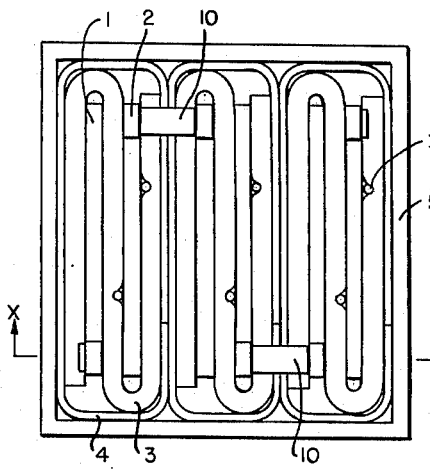
Fig. 1 is a top view of a battery according to the invention consisting of three cells with pins according to the invention inserted between positive plates and separators.
Figure 2:
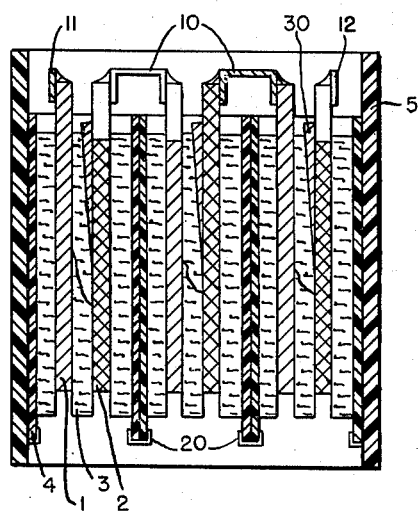
Fig. 2 is an enlarged sectional view taken along line XX of Fig. 1.

Referring to Figs. 1 and 2, each of the three cells comprise two thin, flat, plate electrodes, one a negative sponge lead electrode 1 and the other a positive lead peroxide electrode 2.

A spacer 3 of bibulous sheet material surrounds both electrodes laterally, thus separating the electrodes 1, 2, from each other and from the insulating sheet material which constitutes the hull 4 of the cell. This hull or cell container 4 holds the elements of the electrode-spacer structure laterally together under pressure contact but leaves top and bottom of the electrode-spacer structure open. The bibulous spacer 3 may consist of paper, wood-pulp, microporous rubber, glass wool or other liquid retaining materials, inert to the action of the acid electrolyte. The thickness of the spacer 3 is designed to soak up enough electrolyte (not shown) to allow complete utilization of the active material of the electrodes 1, 2.

The cell hull 4 consists of suitable plastic sheet material such as polystyrene, various poly-vinyl resins, synthetic rubber or other elastomers, Scotch tape, etc. A plurality of such cells in juxtaposition can be easily and tightly packaged, for instance, in an open frame structure or battery frame 5 which surrounds the cells and is of such inner dimensions that the desired number of cells are closely and immovably held together. The battery frame 5 may consist of any of the materials used for the cell hull 4 as enumerated above. Metal tabs 10 electrically connect successive cells in conventional manner; the positive electrode of one end cell and the negative electrode of the other end cell each being provided, respectively, with a positive terminal 11 and a negative terminal 12.

In order to prevent accumulation of liquid electrolyte at the lower edges of the cell container 4, a film 20 of water repellent substance, e. g., petroleum jelly, silicone resins or the like is painted on the lower portions of the sheet material constituting the cell container 4. The film 20 prevents leakage currents which otherwise would follow the electrolyte film accumulated on the lower edges of the hull 4.

To activate the above-described battery, it is immersed partially into sulphuric acid or fluorboric acid electrolyte for about one to three minutes, depending on the size of the battery and the nature of the bibulous material of the spacers 3. After this time, the battery is withdrawn from the liquid electrolyte, shaken to remove excess liquid and is then ready for use.

Figure 3:
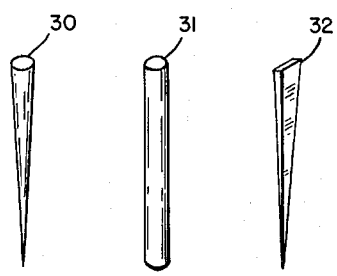
Fig. 3 are elevational views of three different types of plastic pins according to the invention.

According to the invention plastic pins 30 are inserted between the positive plate 2 and the spacer 3 before partial immersion of the assembled battery in the electrolyte. As shown in Fig. 3 such pins may have various geometrical configurations. Pin 30 shows a cone shaped form, pin 31 a cylindrical, and pin 32 a pyramidal form.

The pins according to the invention provide physical space between adjacent cell components and thus allow rapid and even penetration of the electrolyte into the spacers 3; they also provide a path by which entrapped air can escape from the cell. Preferably, these pins are removed from the battery after the latter is withdrawn from the liquid electrolyte.

The pins according to the invention consist preferably of plastic insulating material such as polystyrene, hard rubber, etc. Other insulating materials such as glass, porcelain, or the like may also be used.

The size of the pins will, of course, vary according to the size of the battery. For small size batteries plastic strips of approximately $\frac{1}{2}''$ length and $\frac{1}{16}''$ in diameter have proven very satisfactory.

I claim:

A method of activating deferred action type meteorological batteries of the lead-acid-lead peroxide type, said batteries comprising juxtaposed electrically connected cells, said cells each comprising negative sponge lead electrodes and positive lead peroxide electrodes, said electrodes being separated by spacers of bibulous ionically conductive materials, said electrode spacer structures being laterally held together under pressure contact by hulls of insulating plastic material characterized in that pyramidal pins of dielectric material having a length of about one-half of the length of the electrodes are forced between the positive plates and the spacers before immersion of the battery in the electrolyte and that said pins are removed from the battery after the latter is withdrawn from the liquid electrolyte.

JOHN H. BALDWIN.

References Cited in the file of this patent

UNITED STATES PATENTS

| Number | Name | Date |
|---|---|---|
| 525,017 | Hess | Aug. 28, 1894 |
| 729,100 | Sperry | May 26, 1903 |
| 2,349,763 | Setzer | May 23, 1944 |
| 2,514,151 | Berg et al. | July 4, 1950 |

FOREIGN PATENTS

| Number | Country | Date |
|---|---|---|
| 3,197 | Great Britain | Mar. 2, 1887 |
| 336,448 | Great Britain | Oct. 16, 1930 |
| 555,828 | Germany | June 30, 1930 |